(12) United States Patent
Takasaki

(10) Patent No.: US 6,320,607 B1
(45) Date of Patent: Nov. 20, 2001

(54) ELECTRONIC STILL CAMERA

(75) Inventor: Masaaki Takasaki, Hino (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 08/970,481

(22) Filed: Nov. 14, 1997

(30) Foreign Application Priority Data

Nov. 19, 1996 (JP) .................................................. 8-308370

(51) Int. Cl.$^7$ .................................................. H04N 17/00
(52) U.S. Cl. .......................... 348/64; 348/180; 348/187; 348/189
(58) Field of Search ............................... 348/64, 96, 180, 348/181, 187, 189, 335; 399/133, 154; 396/89, 90, 91, 92, 98, 100

(56) References Cited

U.S. PATENT DOCUMENTS

| | | | |
|---|---|---|---|
| 4,104,650 | * | 8/1978 | Hosoe et al. ............................ 396/91 |
| 4,523,828 | * | 6/1985 | Kato .................................. 250/210.4 |
| 4,634,851 | * | 1/1987 | Ogasawara et al. ................. 250/204 |
| 4,903,055 | * | 2/1990 | Lourette et al. ..................... 396/208 |
| 5,466,560 | * | 11/1995 | Sowinski et al. .................... 430/347 |
| 5,815,748 | * | 9/1998 | Hamamura et al. ................... 348/64 |

* cited by examiner

*Primary Examiner*—Wendy R. Garber
*Assistant Examiner*—Mitchell White
(74) *Attorney, Agent, or Firm*—Jordan B. Bierman; Bierman, Muserlian and Lucas

(57) ABSTRACT

In electronic still camera 30 provided with an image pickup lens constituting optical system 31 which focuses a subject image on a predetermined image-focusing plane; a solid image pickup element CCD which is provided at the position of the image-focusing plane of the image pickup lens and generates image signals by transforming photoelectrically the image obtained by the image pickup lens, and with an A/D converter which converts the image signals from the solid image pickup element into digital signals, when I1 represents an image which is formed by outputting the digital signals obtained by the electronic still camera by an outputting means, I2 represents an image formed by outputting, with said outputting means under the same condition, what is obtained by photographing the same subject with the image pickup lens of the electronic still camera after replacing the solid image pickup element of the electronic still camera with a silver halide light-sensitive material, after reading it with a reading unit, images on plural sheets N are obtained for each of subjects in plural number M types, and an occasion where image I1 shows higher contrast and higher sharpness for each image is represented by 1, while an occasion where image I2 shows higher contrast and higher sharpness for each image is represented by 0, and X represents the total for all images, the condition of $X \geq M \times N \times 0.8$ is satisfied.

9 Claims, 5 Drawing Sheets

ELECTRONIC STILL CAMERA

BACKGROUND OF THE INVENTION

The present invention relates to an electronic still camera, and in particularly, to an electronic still camera wherein an image obtained through an image pickup lens is received by a solid image pickup element, and a still image thus obtained is handled as digital data.

There has been developed an electronic still camera wherein an image is converted to an electric signal by the use of a solid image pickup element to be recorded as an electric signal. An electronic still camera of this type is spreading due to its handiness that it is rapid in reproduction and image processing can also be done, thus an improvement in image quality of the electronic still camera has been desired.

In the case of an electronic still camera in prior art, there has been a big problem with regard to image quality that a false image is generated due to the relation between an interval of adjoining pixels (pixel pitch) of a solid image pickup element and a resolving power of an image pickup lens.

To solve this problem, occurrence of the false image is prevented by arranging an optical low-pass filter between an image pickup lens and a solid image pickup element as described in TOKKAIHEI 7-92430, or by giving a function of an optical low-pass filter to an image pickup lens, or by eliminating a high frequency component which is higher than a critical resolving power determined by a pixel pitch as described in TOKKAISHO 64-917.

As stated above, in the case of an electronic still camera, image quality has been improved by adding an optical low-pass filter to a conventional lens.

Though the resolution has been determined depending on the number of pixels (or pixel pitch), on the other hand, it has been difficult to obtain image quality higher than that obtained by preventing a false image, because components of a specific frequency or higher than that are eliminated as stated above.

For a recent demand for the higher image quality, the technologies mentioned above are not sufficient to obtain satisfactory images, as stated above.

SUMMARY OF THE INVENTION

An object of the invention, therefore, is to realize an electronic still camera equipped with a lens which makes it possible to obtain a high grade image when a solid image pickup element is used for image pickup.

After intensive studies about the relation between a lens and a solid image pickup element, the inventors of the invention found structures for achieving the above-mentioned object, on the point of relationship between a type of an image pickup means (a solid image pickup element or a silver halide light-sensitive material) and a lens, and relationship between the number of pixels of the solid image pickup element used actually and a lens, concerning conditions of the lens which is most appropriate for the solid image pickup element used in an electronic still camera.

Structures 1

An electronic still camera provided with an image pickup lens constituting an optical system which focuses a subject image on a prescribed image-focusing plane, a solid image pickup element which is provided at the position of the image-focusing plane of the image pickup lens and generates image signals by transforming photoelectrically the image obtained by the image pickup lens; and an A/D converter which converts the image signals from the solid image pickup element into digital signals, wherein the optical system satisfies the following condition:

(condition)

$$X \geq M \times N \times 0.8$$

when; I1 represents an image formed by outputting the digital signals obtained by the electronic still camera with an outputting means, I2 represents an image formed by outputting, with said outputting means under the same condition, what is obtained by photographing the same subject with the image pickup lens of the electronic still camera after replacing the solid image pickup element of the electronic still camera with a silver halide light-sensitive material, after reading it with a reading unit, images on plural sheets N are obtained for each of subjects in plural number M types, and an occasion where image I1 shows higher contrast and higher sharpness for each image is represented by 1, while an occasion where image I2 shows higher contrast and higher sharpness for each image is represented by 0, and X represents the total for all images.

In the case of this electronic still camera, it is possible to structure a lens which is suitable for a solid image pickup element and is capable of obtaining a high grade image, and thereby to realize an electronic still camera equipped with a lens capable of obtaining a high grade image when photographing with a solid image pickup element, by designing an image pickup lens which makes a solid image pickup element to obtain better evaluation when images obtained through the same image pickup lens respectively on the solid image pickup element and on a silver halide light-sensitive material are reproduced on a display to be evaluated.

Structure 2

An electronic still camera provided with an image pickup lens constituting an optical system which focuses a subject image on a prescribed image-focusing plane, a solid image pickup element having pixels in quantity A which is provided at the position of the image-focusing plane of the image pickup lens and generates image signals by transforming photoelectrically the image obtained by the image pickup lens, and an A/D converter which converts image signals from the solid image pickup element into digital signals, wherein the optical system satisfies the following conditions:

(conditions)

the total of evaluation points is not less than M×N×0.8, provided that α is greater than 50000, when;

I1 represents an image obtained by the solid image pickup element having pixels in quantity of A, I2 represents an image obtained by a solid image pickup element having pixels in quantity of A+α on its area identical in terms of size to the solid image pickup element having pixels in quantity of A, images on plural sheets N are obtained for each of subjects in plural number M types, and evaluation point 1 represents an occasion where image I1 shows higher contrast and higher sharpness, and evaluation point 0 represents an occasion where image I2 shows higher contrast and higher sharpness, all for evaluation.

In the case of this electronic still camera, it is possible to structure a lens which is suitable for a solid image pickup element with pixels in quantity of A, and is capable of obtaining a high grade image, by designing an image pickup lens which makes the solid image pickup element with pixels in quantity of A to obtain better evaluation when images obtained through the same image pickup lens respectively on the solid image pickup element with pixels in quantity of A and on the solid image pickup element with pixels in quantity of A+α are reproduced on a display to be evaluated, resulting in realization of an electronic still camera equipped with a lens capable of obtaining a high grade image when conducting image pickup with a solid image pickup element.

Structure 3

The electronic still camera in Structure 2 wherein the solid image pickup element with pixels in quantity of A and that with pixels in quantity of A+α are the same in terms of size.

In the case of this electronic still camera, it is possible to structure a lens which is suitable for a solid image pickup element with pixels in quantity of A, and is capable of obtaining a high grade image, by designing an image pickup lens which makes the solid image pickup element with pixels in quantity of A to obtain better evaluation when images obtained through the same image pickup lens respectively on the solid image pickup elements with different number of pixels (image pickup element with pixels in quantity A and that with pixels in quantity A+α) are reproduced on a display to be evaluated, resulting in realization of an electronic still camera equipped with a lens capable of obtaining a high grade image when conducting image pickup with the solid image pickup element.

Structure 4

An electronic still camera wherein, when I1 represents an image obtained by the solid image pickup element with pixels in quantity of A, I2 represents an image obtained by the solid image pickup element having pixels in quantity of A+α on its area identical in terms of size to the solid image pickup element with pixels in quantity of A, images on plural sheets N are obtained for each of subjects in plural number M types, and evaluation point 1 represents an occasion where image I1 shows higher contrast and higher sharpness, and evaluation point 0 represents an occasion where image I2 shows higher contrast and higher sharpness, all for evaluation, an optical system satisfies the condition that the total of the evaluation points mentioned above is not less than M×N×0.8, provided that α is greater than 100000.

In the case of this electronic still camera, it is possible to structure a lens which is especially suitable for a solid image pickup element with pixels in quantity of A, and is capable of obtaining a high grade image, by designing an image pickup lens which makes the solid image pickup element with pixels in quantity of A to obtain better evaluation when images obtained through the same image pickup lens respectively on the solid image pickup elements with pixels in different numbers of A and A+α for evaluation, resulting in realization of an electronic still camera equipped with a lens capable of obtaining a high grade image when conducting image pickup with the solid image pickup element.

Structure 5

An electronic still camera wherein, when I1 represents an image obtained by the solid image pickup element with pixels in quantity of A, I2 represents an image obtained by the solid image pickup element having pixels in quantity of A+α on its area identical in terms of size to the solid image pickup element with pixels in quantity of A, images on plural sheets N are obtained for each of subjects in plural number M types, and evaluation point 1 represents an occasion where image I1 shows higher contrast and higher sharpness, and evaluation point 0 represents an occasion where image I2 shows higher contrast and higher sharpness, all for evaluation, an optical system satisfies the condition that the total of the evaluation points mentioned above is not less than M×N×0.8, provided that a is greater than 500000.

In the case of this electronic still camera, it is possible to structure a lens which is especially suitable for a solid image pickup element with pixels in quantity of A, and is capable of obtaining a high grade image, by designing an image pickup lens which makes the solid image pickup element with pixels in quantity of A to obtain better evaluation when images obtained through the same image pickup lens respectively on the solid image pickup elements with pixels in different numbers of A and A+α are reproduced on a display for evaluation, resulting in realization of an electronic still camera equipped with a lens capable of obtaining a high grade image when conducting image pickup with the solid image pickup element.

Structure 6

An electronic still camera wherein the optical system in Structures 1–5 is one that is equipped with an optical low-pass filter between an image pickup lens and an image focusing plane.

In the case of this electronic still camera, it is possible to structure a lens which is suitable for a solid image pickup element and is capable of obtaining a high grade image even when high frequency components are eliminated by the optical low-pass filter, by designing an image pickup lens which makes the solid image pickup element to obtain better evaluation when images obtained through the same image pickup lens respectively on the solid image pickup element and a silver halide light-sensitive material are reproduced on a display to be evaluated, and thereby to realize an electronic still camera equipped with a lens capable of obtaining a high grade image when conducting image pickup with the solid image pickup element.

In the case of this electronic still camera, it is possible to structure a lens which is especially suitable for a solid image pickup element with pixels in quantity of A, and is capable of obtaining a high grade image even when high frequency components are eliminated by the use of the optical low pass filter, and thereby to realize an electronic still camera equipped with a lens capable of obtaining a high grade image when conducting image pickup with the solid image pickup element, by designing an image pickup lens which makes the solid image pickup element with pixels in quantity of A to obtain better evaluation when images obtained through the same image pickup lens respectively on the solid image pickup elements with pixels in different numbers of A and A+α are reproduced on a display to be evaluated.

DETAILED DESCRIPTION OF THE PREFERRED EMBODIMENT

Embodiments of the invention will be explained in detail as follows.

(electric structure of an electronic still camera)

First, the structure of an electronic still camera used in the present embodiment will be explained, referring to FIG. 1.

Figure 1:
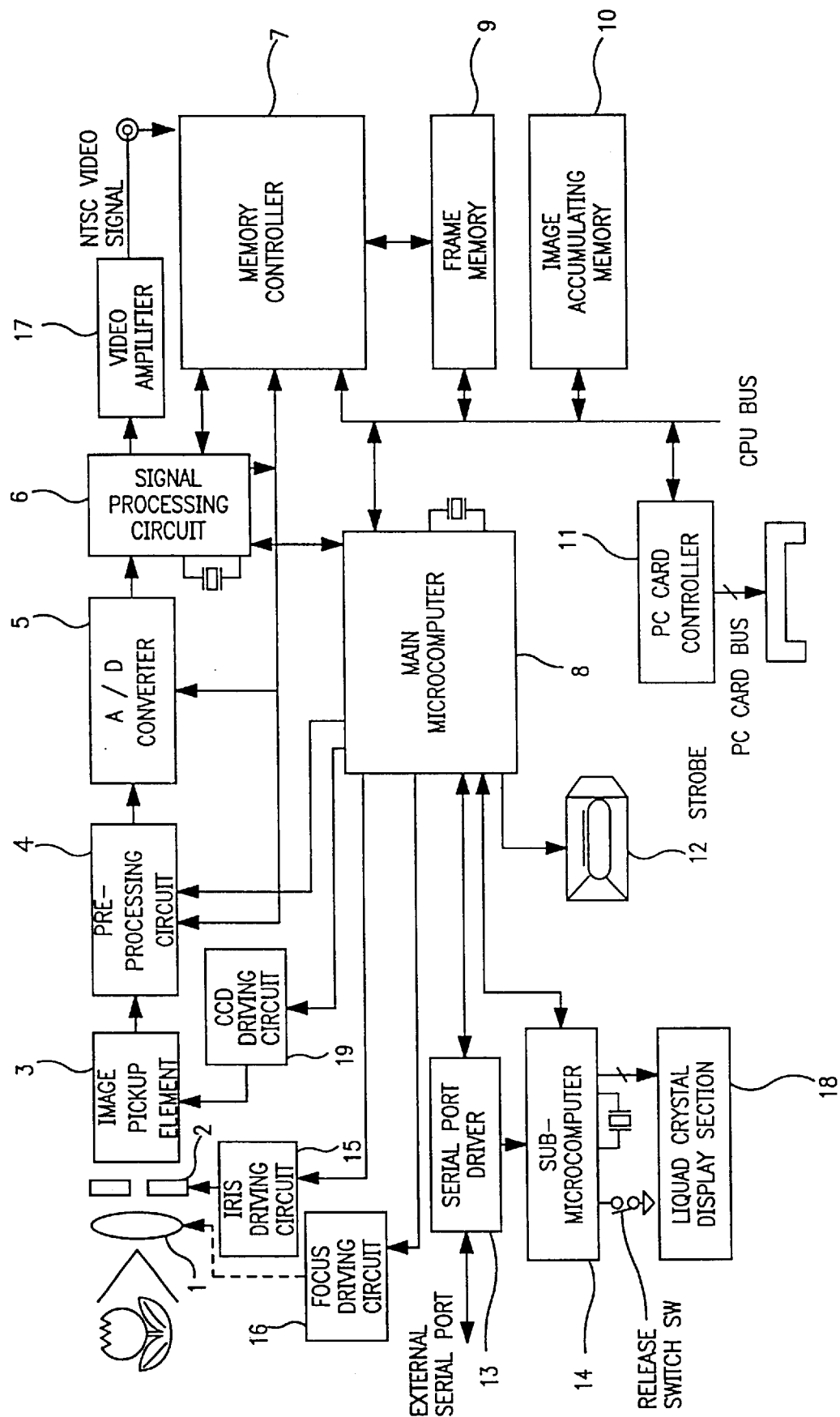
FIG. 1 is a functional block diagram showing the structure of an electronic still camera used in embodiments of the invention.

FIG. 1 is a functional block diagram showing the overall and electrical schematic structure of an electronic still camera in the present embodiment of the invention.

In the electronic still camera shown in FIG. 1, an optical image obtained through an optical system composed of lens 1, iris stop 2 and others is formed on a light-receiving surface of image pickup element 3 such as a CCD. In this case, lens 1 and iris stop 2 are driven respectively by focus driving circuit 16 and iris driving circuit 15.

The image pickup element 3 photoelectrically transfers the optical image formed on the light-receiving surface into a charge amount, and outputs analog image signals through transfer pulse from image pickup element driving circuit 19.

Noises in the analog image singles thus outputted are reduced through CDS (correlative double sampling) processing conducted in preprocessing circuit 4, then, gains are adjusted by AGC, and binary-coding processing for dynamic range extension is conducted.

Then, the analog image signals are converted by A/D converter 5 into digital image signals which are then subjected to brightness processing and color processing in signal processing circuit 6 to be converted into digital video signals (for example, brightness signals (Y) and color difference signals (Cr, Cb) which are further outputted to memory controller 7.

On the other hand, this signal processing circuit 6 is also equipped therein with a D/A converter, whereby, it can output colored image signals inputted from the A/D converter 5 and image data inputted reversely from the memory controller 7, as analog video signals.

Switching of these functions is conducted by data exchange with main microcomputer 8, and in case of need, it is also possible to output exposure information of image pickup element signals, focus signals, and white balance information to the main microcomputer 8.

This main microcomputer 8 mainly controls photographing, recording and reproducing, and when necessary, it conducts compression and reproduction of photographed images and serial port transmission with external equipment. In this case, CCITT and JPEG system standardized by ISO, or JBIG system are used for image compression.

In the memory controller 7, digital image data inputted from the signal processing circuit 6 are accumulated in frame memory 9, or, on the contrary, image data of the frame memory 9 are outputted to the signal processing circuit 6.

The frame memory 9 is an image memory having a capacity to accumulate image data on at least one image plane, and its example used generally includes VRAM, SRAM and DRAM, for example. In this case, however, VRAM capable of operating independently of CPU bus is used.

Image accumulating memory 10 is a memory that is built in the main body, and it accumulates the image data stored in the frame memory 9 and then subjected to image compression processing in the main microcomputer 8. As this image accumulating memory 10. SRAM, DRAM and EEPROM, for example, are used, and EEPROM is preferable when storage of image data in the memory is considered.

PC card controller (PCMCIA controller) 11 is one to connect the main microcomputer 8 with an external recording medium such as PC memory card (hereinafter referred to simply as PC card), whereby, images stored in the frame memory 9 are recorded in the external storage medium through this controller 11 after being subjected to image compression processing in the main microcomputer 8. As an external PC card for storage connected through the PC card controller 11, an SRAM card, a DRAM card and an EEPROM card can be used, and it is also possible to transfer image data directly to a storage medium at a remote location through public lines by the use of modem card or an ISDN card.

Strobe 12 is so arranged that its emission timing can be obtained by the main microcomputer 8 which controls the photographing sequence.

Serial port driver 13 conducts signal exchange for transmitting information between a camera main body and an external equipment. As a serial transmission means, there are recommended standards for serial communication such as an RS232C and an RS422A, and RS232C is used in this case.

Sub-microcomputer 14 controls man/machine interface such as operation switches and liquid crystal display of the camera main body, and conducts, when necessary, information transmission to the main microcomputer 8. In this case, a serial input/output terminal is used for information transmission with the main microcomputer 8. Further, a watch function is also built in, and automatic dating is also controlled.

Iris driving circuit 15 is composed of an auto-iris, for example, and is controlled by the main microcomputer 8 to change a stop value of optical iris 2.

Focus driving circuit 16 is composed of a stepping motor, for example, and is controlled by the main microcomputer 8 to change a lens position so that an optical focus plane of a subject may properly be positioned on image pickup element 3. The numeral 18 represents a liquid crystal display portion which is connected with sub-microcomputer 14 and displays various kinds of information such as photographing information.

Incidentally, in the structure shown in FIG. 1, image compression and image extension are conducted in the main microcomputer 8. However, an exclusive circuit for image compression/extension may be arranged on a CPU bus.

(Basic operations of an electronic still camera)

Next, a series of operations covering from photographing to memory recording will be explained. A mode for camera operations is established based on information of various switches connected with sub-microcomputer 14, and information for photographing is inputted in the main microcomputer 8 as serial information.

In accordance with this information, the main microcomputer 8 establishes memory controller 7 and serial port driver 13. When a release switch on sub-microcomputer 14 is pressed, the sub-microcomputer 14 learns that first switch signal S1 by means of release SW has become active, and issues an image input command to signal processing circuit 6 which causes image pickup element 3, preprocessing circuit 4 and A/D converter 5 to operate to receive image data.

The image data thus received are subjected to basic processing in the signal processing circuit 6, and then, focus information is prepared from high frequency components of brightness data, and exposure data are prepared from low frequency components. The main microcomputer 8 reads these data from the signal processing circuit 6, and conducts, when necessary, iris driving, focus driving, and further gain control of AGC amplifier of preprocessing circuit 4, so that appropriate exposure and focusing may be obtained. Further, depending on an operation mode, it is also possible to output analog image signals from the signal processing circuit 6 through video amplifier 17 as an NTSC video signal.

After exposure, when a signal showing that second release switch signal S2 by means of release SW has been pressed is inputted from the sub-microcomputer 14 into the main microcomputer 8 after focusing has been converged to an appropriate value, the main microcomputer 8 outputs a command for taking in data to memory controller 7. It further outputs, in case of need, an emission signal to strobe 12 at field timing of images to be taken in. The memory controller 7, when receives the command for taking in data, detects a synchronization signal from the signal processing circuit 6, and takes image data in forms of Y, Cr and Cb which are outputted from the signal processing circuit 6 into frame memory 9 at prescribed timing.

When taking images in frame memory 9 is completed, the memory controller 7 indicates a status showing that the taking in has been completed. When the status is read by the main microcomputer 8, it is learned that photographing has been completed with the main microcomputer 8. After completion of the photographing, the main microcomputer 8 conducts image compression, if necessary, and sends image data to image accumulating memory 10, IC card connected with external equipment, or a personal computer connected with an external serial port.

In the case of reproduction display operations, image data are read by the main microcomputer 8 from image accumulating memory 10, IC card connected to external equipment, or a personal computer connected with an external serial port, then image extension is conducted, in case of need, and image data are written in frame memory 9. After that, image data are read by the signal processing circuit 6 and memory controller 7, and analog signals of the image are outputted to an output terminal through the signal processing circuit 6. Thus, the function of the camera for photographing, recording, reproducing, displaying and sending are attained.

Next, operations for serial communication will be explained. Serial communication with external computers is possible through an external serial port which is driven by the serial port driver 13. The electronic still camera explained here operates, when connected with a computer, as a slave mode wherein input from the switch of the camera itself is prohibited and a command from the computer is accepted.

This is to prevent that a request made by the operation of a camera and a request made by the operation from a computer are different each other. The electronic still camera which is under the slave mode displays on its liquid crystal display section 18 that it is under the slave mode.

Incidentally, the electronic still camera which has received a command or data stores them in an EEPROM and sub-microcomputer. For example, date and time are stored in the sub-microcomputer which is in charge of watch functions, and operations can be realized in accordance with a mode of customized data transmitted even after the connection with a computer has been cut. Further, what is related to these data is also initially set in the electronic still camera in advance, and operations can be done even when data are not transferred by the computer. On the part of the electronic still camera, there are provided plural places (banks) where customized data are stored, whereby, it is also possible to change to the desired state easily.

Since the data established on the part of a computer can be preserved also on the part of the computer, establishment for the following occasion can also be conducted in the same manner.

(Optical structure of an electronic still camera)

Figure 2:
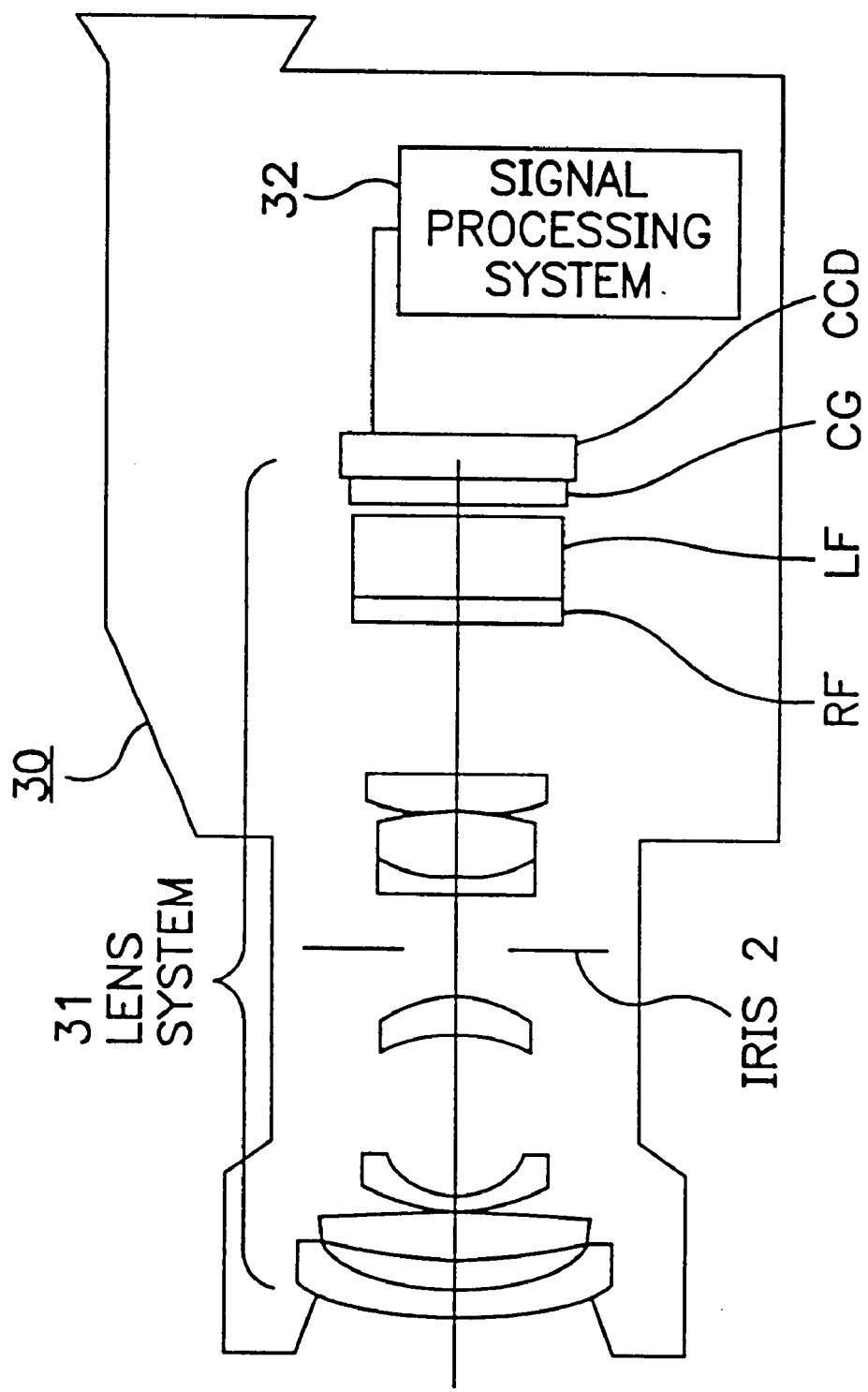
FIG. 2 is a lens arrangement diagram showing the schematic optical structure of an electronic still camera used in embodiments of the invention.
Figure 3:
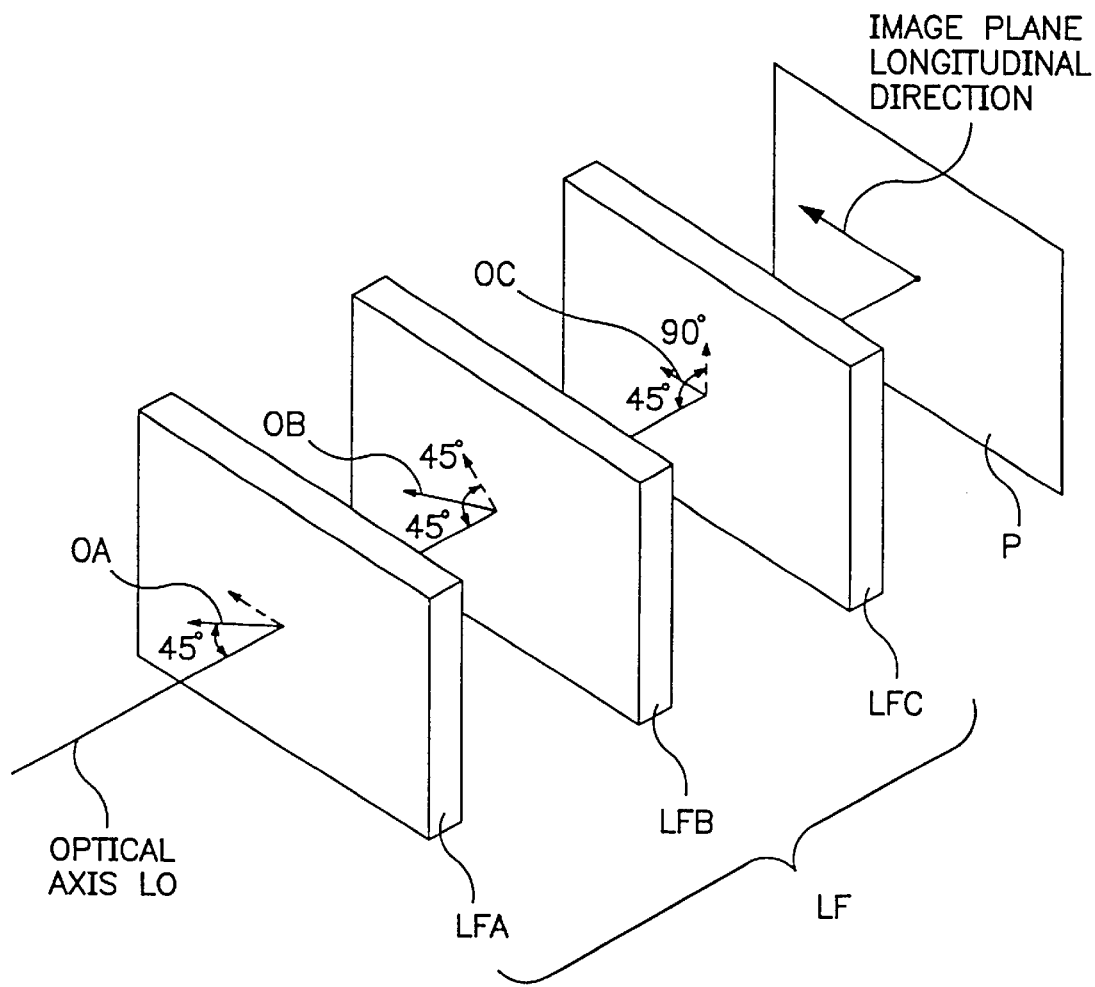
FIG. 3 is an exploded sketch of optical low-pass filter LF of an electronic still camera used in embodiments of the invention.

FIG. 2 is a lens arrangement diagram showing the total optical and schematic structure of an electronic still camera in an embodiment of the invention.

In FIG. 2, electronic still camera 30 is composed of lens system 31 which has been explained as lens 1 in FIG. 1, solid-state image pickup element CCD, and signal processing system 32 including a signal processing circuit explained in FIG. 1.

Optical system 31 is structured so that light passes through 7 image pickup lenses as shown here, infrared blocking filter RF, optical low-pass filter LF and cover glass CG to form an image on the solid-state image pickup element CCD.

Optical low-pass filter cuts high spatial frequency component.

The solid-state image pickup element CCD used in the present embodiment is ICX084K (trade name) made by Sony Corp. which means that a CCD to be used is one for reading all pixels of about 330,000 having an aspect ratio of 4:3, light-receiving surface dimension of ⅓ inches, pixel pitch of 7.4 μm and effective number of pixels of 659 H×494V.

Optical low-pass filter LF is composed of three crystal plates LFA, LFB and LFC whose crystal axis are different from each other.

Namely, there are combined three crystal plates LFA, LFB and LFC whose optical axes OA, OB and OC are tilted by 45° from optical axis LO and they respectively form angles of 0°, 45° and 90° from the longitudinal direction when they are projected on a plane perpendicular to optical axis LO. Incidentally, thickness of each crystal plate is shown in Table 1 below.

TABLE 1

| Crystal plate | Thickness of each crystal plate (mm) |
| --- | --- |
| 0° | 1.22 |
| 45° | 0.87 |
| 90° | 1.22 |

In the present embodiment examples as well as comparative examples shown below, f represents a focal length (mm), F is a stop value, R is a radius of curvature (mm) of a refraction plane, D is a distance (mm) between refraction planes, Nd is the refractive index on line d, ν d is Abbe number on line d, and P is a minimum value (mm) of a distance between centers of neighboring photosensors in solid-state image pickup element CCD.

Concrete examples of the embodiment will be explained as follows.

First Embodiment

In an electronic still camera provided with an image pickup lens and a solid image pickup element as stated above, arrangements are made to satisfy the condition of X≧M×N×0.8, when; I1 represents an image obtained by outputting digital signals obtained by the electronic still camera by an outputting means, I2 represents an image obtained by reading, with a reading unit, what is obtained by photographing the same subject with the image pickup lens of the electronic still camera after replacing the solid image pickup element of the electronic still camera with a silver halide light-sensitive material, and thereby by outputting them with the aforesaid outputting means under the same condition, images on plural sheets N are obtained for each of subjects in plural number M types, and 1 represents an evaluation point in the case where image I1 shows higher contrast and higher sharpness for each image, 0 represents an evaluation point in the case where image I2 shows higher contrast and higher sharpness for each image, and X represents the total of the evaluation points for all images.

In this case, a silver halide light-sensitive material having the same sensitivity as in the solid image pickup element is used, and a film scanner employing a solid image pickup element is further used to read the silver halide light-sensitive material which has been subjected to photographing.

The same condition for reproduction on a display means the same conditions such as a display size, a size of an image on the display and image processing for image signals, all for reproduction.

In the case of this electronic still camera constituted as stated above, it is possible to structure a lens which is suitable for a solid image pickup element and is capable of obtaining a high grade image, and thereby to realize an electronic still camera equipped with a lens capable of obtaining a high grade image when photographing with a solid image pickup element, by designing an image pickup lens which makes a solid image pickup element to obtain better evaluation when images obtained through the same image pickup lens respectively on the solid image pickup element and on a silver halide light-sensitive material are printed and evaluated.

It is further possible to eliminate unnecessary high frequency components by providing an optical low-pass filter between an image pickup lens and an image-focusing plane, and thereby to obtain higher grade images.

Second Embodiment

In the electronic still camera as stated above provided with an image pickup lens constituting an optical system which focuses a subject image on a prescribed image-focusing plane, a solid image pickup element having pixels in quantity of A which is provided at the position of the image-focusing plane of the image pickup lens and generates image signals by transforming photoelectrically the image obtained by the image pickup lens, and an A/D converter which converts image signals from the solid image pickup element into digital signals, arrangements were made to satisfy the condition that the total of the evaluation points mentioned above is not less than M×N×0.8, provided that α is greater than 50000, when I1 represents an image obtained by the solid image pickup element having pixels in quantity of A, I2 represents an image obtained by the solid image pickup element having pixels in quantity of A+α on its area identical in terms of size to the solid image pickup element having pixels in quantity of A, images on plural sheets N are obtained for each of subjects in plural number M types, evaluation point 1 represents an occasion where image I1 shows higher contrast and higher sharpness, and evaluation point 0 represents an occasion where image I2 shows higher contrast and higher sharpness, all for evaluation.

Incidentally, a size of a solid image pickup element is a size of a light-receiving surface represented by a length of its diagonal line indicated, for example, by ⅓ inch, ¼ inch or ⅕ inch.

(1) As stated above, a solid image pickup element measuring ⅓ inch in size and covering 330,000 pixels is used, and it is evaluated through comparison with a solid image pickup element which contains 380000 pixels and is the same in terms of size as that measuring ⅓ inch and covering 330000 pixels (or, a solid image pickup element containing 380000 pixels or more within ⅓ inch).

(2) Further, evaluation is conducted through comparison with a solid image pickup element which measures ⅓ inch and contains 430000 pixels under the condition of α>100000.

(3) In addition, evaluation is conducted through comparison with a solid image pickup element which measures ⅓ inch and contains 830000 pixels under the condition of α>500000.

In the case of these electronic still cameras, it is possible to structure a lens which is suitable for a solid image pickup element with pixels in quantity of A, and is capable of obtaining a high grade image even when high frequency components are eliminated by the use of the optical low-pass filter, by designing an image pickup lens which makes the solid image pickup element with pixels in quantity of A to obtain better evaluation when images obtained through the same image pickup lens respectively on the solid image pickup elements with pixels in different numbers of A and A+α are printed and evaluated, resulting in realization of an electronic still camera equipped with a lens capable of obtaining a high grade image when conducting image pickup with the solid image pickup element.

1)

In the case of these electronic still cameras, it is possible to structure a lens which is suitable for a solid image pickup element with pixels in quantity of A, and is capable of obtaining a high grade image and thereby to realize an electronic still camera equipped with a lens capable of obtaining a high grade image when conducting image pickup with the solid image pickup element, by designing an image pickup lens which makes the solid image pickup element with pixels in quantity A to obtain better evaluation when images obtained through the same image pickup lens respectively on the solid image pickup elements with pixels in different numbers of A and A+α are printed for evaluation.

Though an assumption in the present embodiment is to use a solid image pickup element with 330000 pixels, even when a solid image pickup element with pixels in quantity other than 330000 is used, solid image pickup elements having the value of α mentioned above can be used as comparison for evaluation.

Incidentally, when an optical low-pass filter is provided between an image pickup lens and an image-focusing plane, unnecessary high frequency components can be eliminated, which makes a solid image pickup element to pick up images easily so that high grade images may be obtained.

EXAMPLES

The above-mentioned embodiment will be verified in detail as follows, referring to examples and comparative examples.

Example 1

In Example 1, a solid image pickup element measuring ⅓ and covering 330000 pixels is used.

Figure 4:
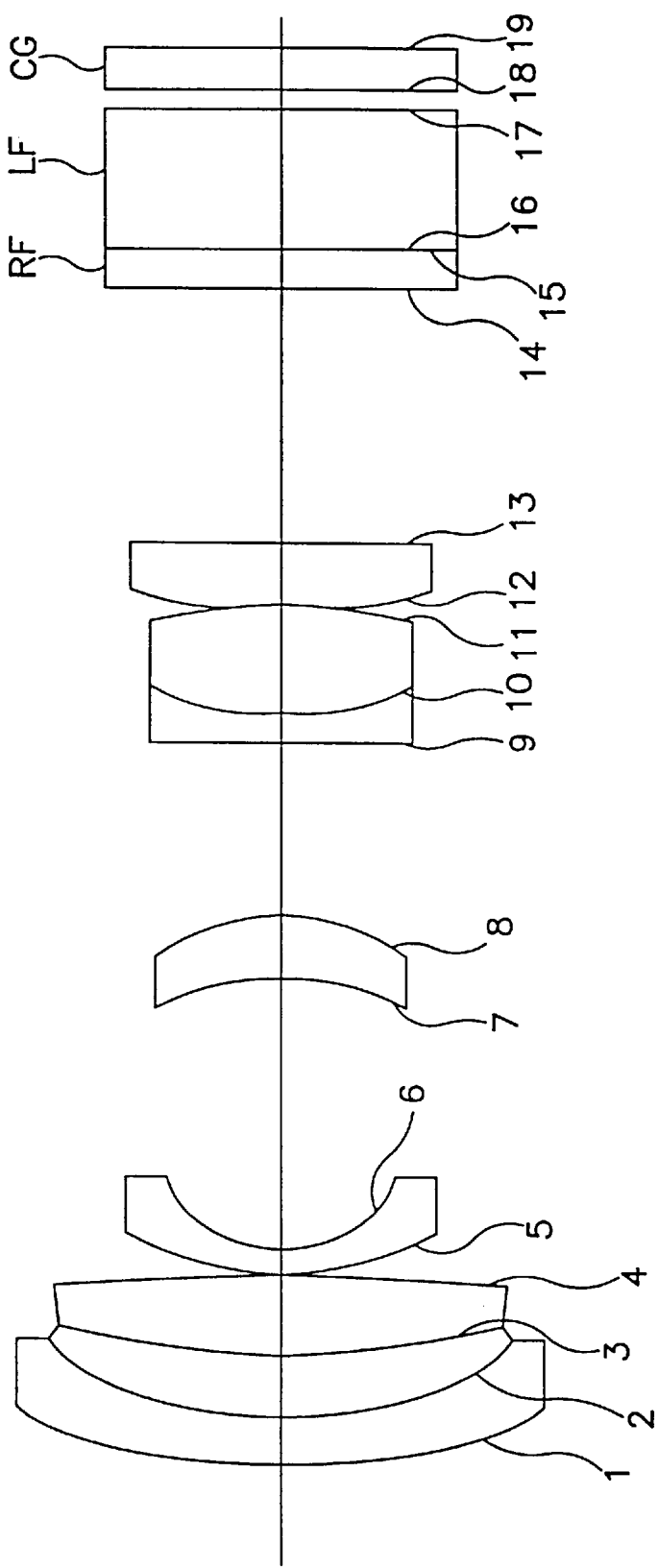
FIG. 4 is a sectional view of an optical system of an image pickup lens in Example 1 of the invention.

FIG. 4 shows an optical section of an image pickup lens of Example 1, while Table 2 shows optical data of Example 1.

TABLE 2

| f = 6.035 Surface number | F = 2.8 R | D | Nd | vd | P = 0.0074 |
|---|---|---|---|---|---|
| 1 | 12.502 | 0.80 | 1.65844 | 50.9 | |
| 2 | 7.757 | 1.50 | | | |
| 3 | 23.343 | 1.70 | 1.80518 | 25.4 | |
| 4 | −55.611 | 0.20 | | | |
| 5 | 6.965 | 0.70 | 1.72000 | 50.2 | |
| 6 | 3.436 | 6.06 | | | |
| 7 | −5.912 | 1.50 | 1.58913 | 61.2 | |
| 8 | −5.127 | 4.02 | | | |
| 9 | 100.031 | 0.60 | 1.84666 | 23.8 | |
| 10 | 6.788 | 2.60 | 1.77250 | 49.6 | |
| 11 | −12.521 | 0.20 | | | |
| 12 | 19.019 | 1.40 | 1.78590 | 44.2 | |
| 13 | −89.125 | 5.31 | | | |
| 14 | ∞ | 1.00 | 1.52000 | 65.0 | } Infrared blocking filter |
| 15 | ∞ | 0.00 | | | |
| 16 | ∞ | 3.31 | 1.54880 | 67.0 | } Cover glass serving as low-pass filter |
| 17 | ∞ | 0.20 | | | |
| 18 | ∞ | 0.75 | 1.51633 | 64.1 | } Cover glass |
| 19 | ∞ | | | | |

Lens performance of this image pickup lens will be shown below.

Resolving power (center)=160 lines/mm or more

Resolving power (periphery)=100 lines/mm or more

Brightness of the edge of image field (position that is farthest from the center) is 0.75 when brightness at the center of a light-receiving surface is assumed to be 1 at the position of a solid image pickup element, which means that the brightness of the edge of image field is greater than that resulted from an ordinary conventional lens for a silver halide light-sensitive material.

First, an electronic still camera employing the aforesaid optical system and the solid image pickup element measuring ⅓ inch and containing 330000 pixels was used to photograph a subject to obtain a digital image signal. By using this digital image signal, a print in L size (89×127 mm) was obtained by a CRT printer (made by Konica Corp.). This image is represented try I1.

A color film "Konica Color LV100" (trade name) made by Konica Corp. was used as a silver halide material having the same sensitivity as that of a solid image pickup element.

By using a silver halide light-sensitive material which has been processed, a print in L size was obtained from an area (36 mm wide×3.6 mm long) which corresponds to a light-receiving area of a solid image pickup element measuring ⅓ inch of an electronic still camera. This image is represented by I2.

Images on plural sheets N (N=5) are obtained for each of subjects in plural types M (M=10). Namely, images in M×N sheets are obtained for each of I1 and I2. As a subject in this case, the total of 10 sheets including resolving power measuring bar charts (ISO Standards) for comparing contrast and sine wave charts whose reflectance for comparing sharpness changes in a form of a sine wave, are used. An image obtained through the resolving power chart makes it possible to compare the degree of height of resolution corresponding to the contrast, and the image which can be read more finely is regarded to be of a higher contrast. Further, comparison between the sine wave chart and an image obtained by photographing the sine wave chart makes it possible to evaluate sharpness, and an image which reproduces a density variation of the original chart with a higher fidelity is regarded to be of a higher sharpness. Now, each of appraisers in N persons (N=5) corresponding to N sheets compares subject images in M types, and the occasion where both contrast and sharpness are high on image I1 is represented by 1 point, while the occasion where they are high on image I2 is represented by 0 point. The total for all appraisers is represented by X.

After the foregoing, evaluation results shown below were obtained.

| Appraisers | a | b | c | d | e |
|---|---|---|---|---|---|
| Contrast | 8 | 9 | 8 | 10 | 9 |
| Sharpness | 10 | 7 | 8 | 10 | 9 |
| Evaluation points (average) | 9 | 8 | 8 | 10 | 9 |

Therefore, the Example 1 shows the total of evaluation points (average) X=44 and M×N=50, and the lens therein satisfies X≧M×N×0.8 which is the condition of the invention.

Comparative Example 1

Figure 5:
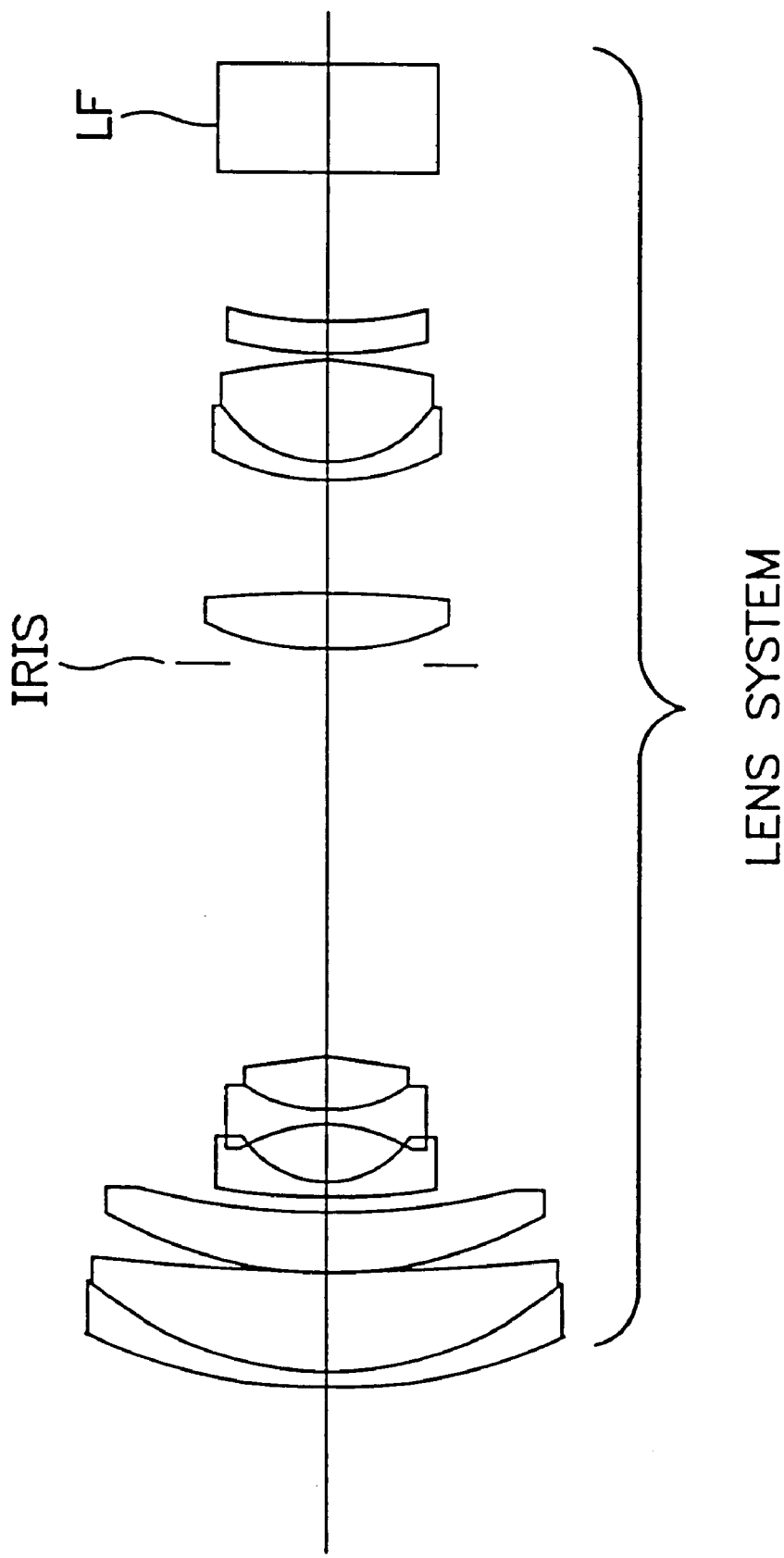
FIG. 5 is a sectional view of an optical system of an image pickup lens in Comparative Example 1 of the invention.

FIG. 5 shows an optical section of an image pickup lens of Comparative example 1 whose performances are shown below.

Resolving power (center)=150 lines/mm

Resolving power (periphery)=90 lines/mm

Brightness of the edge of image field (position that is farthest from the center) is 0.48 when brightness at the center of a light-receiving surface is assumed to be 1 at the position of a solid image pickup element.

Comparative example 1 was also subjected to the same evaluation as that for the aforesaid Example 1.

| Appraisers | a | b | c | d | e |
|---|---|---|---|---|---|
| Contrast | 4 | 6 | 5 | 4 | 5 |
| Sharpness | 6 | 6 | 4 | 4 | 3 |
| Evaluation points (average) | 5 | 6 | 5 | 4 | 4 |

Therefore, the Comparative example 1 shows the total of evaluation points (average) X=24 and M×N=50, and the lens therein does not satisfy X≧M×N×0.8 which is the condition of the invention.

Incidentally, in the case of the optical system in the Comparative example 1, the evaluation point is about 5 points respectively, and it is indicated that an image obtained by the solid image pickup element is about the same as an image obtained on a silver halide light-sensitive material. (Image quality evaluation for Example 1 and Comparative example 1)

With regard to images obtained by the image pickup lenses of the Example 1 and Comparative example 1, images of the Example 1 and images of the Comparative example 1 were subjected to relative evaluation conducted by 5 appraisers.

In this case, each of 5 appraisers (a–e) compared 10 types of images in the same way as in each Example mentioned above, and evaluated them by giving evaluation point 1 to the occasion where the Example 1 showed better image quality, while giving evaluation point 0 to the occasion where the Comparative example 1 showed better image quality.

Images obtained by an electronic still camera employing the optical system of Example 1 and images obtained by an electronic still camera employing the optical system of Comparative example 1 were evaluated through comparison between them by 5 appraisers. The occasion where the images of the former were better was represented by 1, while the occasion where the images of the latter were better was represented by 0.

| Appraisers | a | b | c | d | e |
|---|---|---|---|---|---|
| Contrast | 9 | 9 | 10 | 9 | 10 |
| Sharpness | 9 | 9 | 10 | 9 | 10 |
| Average | 9 | 9 | 10 | 9 | 10 |

Therefore, it was judged between Example 1 and Comparative example 1 that image quality of the images obtained by the optical system of Example 1 was far better than the other. In particular, the images obtained by the optical system of Example 1 were superior on the points of sharpness, contrast and uniformity of brightness within an image.

Namely, it is possible to structure a lens which is suitable for a solid image pickup element and is capable of obtaining a high grade image, and thereby to realize an electronic still camera equipped with a lens capable of obtaining a high grade image when photographing with a solid image pickup element, by designing an image pickup lens which makes a solid image pickup element to obtain better evaluation when images obtained through the same image pickup lens respectively on the solid image pickup element and on a silver halide light-sensitive material are reproduced for evaluation.

Example 2

First, an electronic still camera employing the aforesaid optical system and the solid image pickup element measuring ⅓ inch and containing 330000 pixels was used to photograph a subject to obtain a digital image signal. By using this digital image signal, a print in L size (89×127 mm) was obtained by a CRT printer (made by Konica Corp.). This image is represented by I1. In the same way, a print in L size was obtained by an electronic still camera employing the same optical system and a solid image pickup element measuring ⅓ inch and containing 570000 pixels. This image is represented by I2. Difference α of the number of pixels between the two solid image pickup elements mentioned above is 240000 pixels, and it satisfies the condition of α>50000 and α>100000.

Images on plural sheets N (N=5) are obtained for each of subjects in plural number M types (M=10) Namely, images in M×N sheets are obtained for each of I1 and I2. As a subject in this case, the total of 10 sheets including resolving power measuring bar charts (ISO Standards) for comparing contrast and sine wave charts whose reflectance for comparing sharpness changes in a form of a sine wave, are used. An image obtained through the resolving power chart makes it possible to compare the degree of height of resolution corresponding to the contrast, and the image which can be read more finely is regarded to be of a higher contrast. Further, comparison between the sine wave chart and an image obtained by photographing the sine wave chart makes it possible to evaluate sharpness, and an image which reproduces a density variation of the original chart with a higher fidelity is regarded to be of a higher sharpness. Now, each of appraisers in N persons (N=5) corresponding to N sheets compares subject images in M types, and the occasion where both contrast and sharpness are high on image I1 is represented by 1 point, while the occasion where they are high on image I2 is represented by 0 point. The total for all appraisers is represented by X.

After the foregoing, evaluation results shown below were obtained.

| Appraisers | a | b | c | d | e |
|---|---|---|---|---|---|
| Contrast | 7 | 9 | 7 | 10 | 9 |
| Sharpness | 9 | 9 | 9 | 10 | 9 |
| Evaluation points (average) | 8 | 9 | 8 | 10 | 9 |

Therefore, the Example 2 shows the total of evaluation points (average) X=44 and M×N=50, and the optical system of the Example 2 satisfies X≧M×N×0.8 which is the condition of the invention.

Namely, it is indicated that images obtained by the solid image pickup element containing 330000 pixels are better than those obtained by the solid image pickup element measuring the same size as that in the former and containing 570000 pixels. In other words, images obtained by the solid image pickup element having the smaller pixel pitch show lower contrast and lower sharpness.

Comparative Example 2

As an image pickup lens of Comparative example 2, an image pickup lens which is the same as that in Comparative example 1 (a sectional view of the optical system is shown in FIG. 5) is used.

Incidentally, in this case, an image obtained by a solid image pickup element measuring ⅓ inch and containing 330000 pixels (pixel pitch=7.4 μm) is represented by I1, and an image obtained by a solid image pickup element being in the same size of ⅓ inch and containing 570000 pixels (pixel pitch=6.0 μm) is represented by I2.

Evaluation identical to that in Example 2 was conducted.

| Appraisers | a | b | c | d | e |
|---|---|---|---|---|---|
| Contrast | 6 | 6 | 4 | 4 | 2 |
| Sharpness | 4 | 6 | 6 | 4 | 2 |
| Evaluation points (average) | 5 | 6 | 5 | 4 | 2 |

Therefore, Comparative example 2 shows the total of evaluation points (average) X=22 and M×N=50, and the optical system of the Comparative example 2 does not satisfy X≧M×N×0.8 which is the condition of the invention.

Further, in the case of the optical system in the Comparative example 1, the evaluation point is about 5 points respectively, and it is indicated that an image obtained by the solid image pickup element containing 330000 pixels is about the same as an image obtained by a solid image pickup element being in the same size as the former and containing 570000 pixels.

(Image quality evaluation for Example 2 and Comparative example 2)

With regard to images obtained by the image pickup lenses of the Example 2 and Comparative example 2, images of the Example 2 and images of the Comparative example 2 were subjected to relative evaluation conducted by 5 appraisers.

In this case, each of 5 appraisers (a–e) compared 10 types of images in the same way as in each Example mentioned above, and evaluated them by giving evaluation point 1 to the occasion where the Example 2 showed better image quality, while giving evaluation point 0 to the occasion where the Comparative example 2 showed better image quality.

After the foregoing, evaluation results shown below were obtained.

| Appraisers | a | b | c | d | e |
|---|---|---|---|---|---|
| Contrast | 7 | 9 | 7 | 10 | 9 |
| Sharpness | 9 | 9 | 9 | 10 | 9 |
| Evaluation points (average) | 8 | 9 | 8 | 10 | 9 |

Therefore, it was judged between Example 2 and Comparative example 2 that image quality of the images obtained by the optical system of Example 2 was far better than the other. In particular, the images obtained in Example 2 were superior on the points of sharpness, contrast and uniformity of brightness within an image.

Namely, it is possible to structure a lens which is suitable for a solid image pickup element with the number of pixels scheduled to be used and is capable of obtaining a high grade image, and thereby to realize an electronic still camera equipped with a lens capable of obtaining a high grade image, by designing an image pickup lens which makes a solid image pickup element scheduled to be used to obtain better evaluation when images obtained through the same image pickup lens respectively on the solid image pickup element with high density pixels and on a solid image pickup element scheduled to be used are reproduced and evaluated.

As explained in detail above regarding to the embodiment and examples, the inventions described in this specification provide the following effects.

In the electronic still camera in Structure1, the condition of $X \geq M \times N \times 0.8$ is satisfied, when; I1 represents an image formed by outputting the digital signals obtained by the electronic still camera with an outputting means, I2 represents an image formed by outputting, with said outputting means under the same condition, what is obtained by photographing the same subject with the image pickup lens of the electronic still camera after replacing the solid image pickup element of the electronic still camera with a silver halide light-sensitive material, after reading it with a reading unit, images on plural sheets N are obtained for each of subjects in plural number M types, and an occasion where image I1 shows higher contrast and higher sharpness for each image is represented by 1, while an occasion where image I2 shows higher contrast and higher sharpness for each image is represented by 0, and X represents the total for all images.

In the case of this electronic still camera, it is possible to structure a lens which is suitable for a solid image pickup element and is capable of obtaining a high grade image, and thereby to realize an electronic still camera equipped with a lens capable of obtaining a high grade image when photographing with a solid image pickup element, by designing an image pickup lens which makes a solid image pickup element to obtain better evaluation when images obtained through the same image pickup lens respectively on the solid image pickup element and on a silver halide light-sensitive material are reproduced on a display to be evaluated.

In an electronic still camera in Structure 2, it is so arranged that the optical system mentioned above satisfies the condition that the total of the evaluation points is not less than $M \times N \times 0.8$ provided that a is greater than 50000, when I1 represents an image obtained by the solid image pickup element having pixels in quantity of A, I2 represents an image obtained by the solid image pickup element having pixels in the number of A+α on the area identical in terms of size to the solid image pickup element having pixels in quantity of A, images on plural sheets N are obtained for each of subjects in plural number M types, evaluation point 1 represents an occasion where image I1 shows higher contrast and higher sharpness, and evaluation point 0 represents an occasion where image I2 shows higher contrast and higher sharpness, and evaluation is conducted.

In the case of this electronic still camera, it is possible to structure a lens which is suitable for a solid image pickup element with pixels in quantity of A, and is capable of obtaining a high grade image, by designing an image pickup lens which makes the solid image pickup element with pixels in quantity of A to obtain better evaluation when images obtained through the same image pickup lens respectively on the solid image pickup element with pixels in quantity of A and on the solid image pickup element with pixels in quantity of A+α are reproduced on a display to be evaluated, resulting in realization of an electronic still camera equipped with a lens capable of obtaining a high grade image when conducting image pickup with a solid image pickup element.

In Structure 3 wherein the solid image pickup element with pixels in quantity of A and that with pixels in quantity of A+α both in the electronic still camera in the Structure 2 are the same in size, it is possible to structure a lens which is suitable for a solid image pickup element with pixels in quantity of A, and is capable of obtaining a high grade image, by designing an image pickup lens which makes the solid image pickup element with pixels in quantity of A to obtain better evaluation when images obtained through solid image pickup elements each being the same in size and having different number of pixels are reproduced on displays under the same condition to be evaluated, and thereby to realize an electronic still camera equipped with a lens capable of obtaining a high grade image when conducting image pickup with the solid image pickup element.

In an electronic still camera in Structure 4, it was so arranged that the optical system mentioned above satisfies the condition that the total of the evaluation points is not less than $M \times N \times 0.8$, when I1 represents an image obtained by the solid image pickup element with pixels in quantity A, I2 represents an image obtained by the solid image pickup element having pixels in quantity of A+α on the area identical in terms of size to the solid image pickup element with pixels in quantity of A, images on plural sheets N are obtained for each of subjects in plural types M for comparison, and evaluation point 1 represents the case where image I1 shows better image quality, and evaluation point 0 represents the case where image I2 shows better image quality, both to evaluate under the condition of α>100000.

In the case of this electronic still camera, it is possible to structure a lens which is especially suitable for a solid image pickup element with pixels in quantity of A, and is capable of obtaining a high grade image, by designing an image pickup lens which makes the solid image pickup element with pixels in quantity A to obtain better evaluation when images obtained through the same image pickup lens. respectively on the solid image pickup elements with pixels in different numbers of A and A+α are reproduced on a display to be evaluated, resulting in realization of an electronic still camera equipped with a lens capable of obtaining a high grade image when conducting image pickup with the solid image pickup element.

In an electronic still camera in Structure 4, it was so arranged that the optical system mentioned above satisfies the condition that the total of the evaluation points is not less than $M \times N \times 0.8$, when I1 represents an image obtained by the solid image pickup element with pixels in quantity A, I2 represents an image obtained by the solid image pickup element having pixels in quantity of A+α on the area identical in terms of size to the solid image pickup element with pixels in quantity of A, images on plural sheets N ate obtained for each of subjects in plural types M for comparison, and evaluation point 1 represents the case where image I1 shows better image quality, and evaluation point 0 represents the case where image I2 shows better image quality, both to evaluate under the condition of α>500000.

In the case of this electronic still camera, it is possible to structure a lens which is especially suitable for a solid image pickup element with pixels in quantity of A, and is capable of obtaining a high grade image, by designing an image pickup lens which makes the solid image pickup element with pixels in quantity A to obtain better evaluation when images obtained through the same image pickup lens respectively on the solid image pickup elements with pixels in different numbers of A and A+α are reproduced on a display to be evaluated, resulting in realization of an electronic still camera equipped with a lens capable of obtaining a high grade image when conducting image pickup with the solid image pickup element.

In an electronic still camera in Structure 6, it was so arranged that an optical low-pass filter is provided between the image pickup lens and an image-focusing plane with regard to the optical system of the invention in Structures 1–5.

In the case of this electronic still camera, it is possible to structure a lens which is suitable for a solid image pickup element and is capable of obtaining a high grade image even when high frequency components are eliminated by the optical low-pass filter, by designing an image pickup lens which makes the solid image pickup element to obtain better evaluation when images obtained through the same image pickup lens respectively on the solid image pickup element and a silver halide light-sensitive material are reproduced on a display to be evaluated, and thereby to realize an electronic still camera equipped with a lens capable of obtaining a high grade image when conducting image pickup with the solid image pickup element.

In the case of this electronic still camera, it is possible to structure a lens which is especially suitable for a solid image pickup element with pixels in quantity of A, and is capable of obtaining a high grade image even when high frequency components are eliminated by an optical low-pass filter, by designing an image pickup lens which makes the solid image pickup element with pixels in quantity of A to obtain better evaluation when images obtained through the same image pickup lens respectively on the solid image pickup element with pixels in quantity of A and on the solid image pickup element with pixels in quantity of A+α are reproduced on a display to be evaluated, resulting in realization of an electronic still camera equipped with a lens capable of obtaining a high grade image when conducting image pickup with the solid image pickup element.

What is claimed is:

1. An electronic still camera comprising:
   an optical system including an image pickup lens, for focusing an image on a predetermined image-focusing plane;
   a solid-state image pickup element provided on the predetermined image-focusing plane and photoelectrically converting the focused image so as to generate image signals; and
   an A/D converter for converting the image signals into digital image signals;
   wherein (1) an image I1 is obtained in such a manner that a subject image is focused by the optical system on the solid-state image pickup element so as to obtain first digital image signals and the image I1 is formed on a sheet by an outputting means based on the first digital image signals, (2) an image I2 is obtained in such a manner that the same subject image is focused by the optical system on a silver halide photographic material provided on the image-focusing plane in place of the solid-state image pickup element, the silver halide photographic material is developed so as to obtain a visual image, the visual image is read by an image reading means so as to generate second digital image signals and the image I2 is formed on a sheet by the outputting means based on the second digital image signals, (3) the image I1 and I2 are obtained on plural sheets N respectively for each of plural different subject images M, (4) the images I1 and I2 are evaluated in terms of contrast and sharpness, in the case that the image I1 shows higher contrast and higher sharpness than the image I2, an evaluation value is 1, and in the case that the image I2 shows higher contrast and higher sharpness than the image I2, an evaluation value is 0, the total evaluation value X is obtained by summing up the evaluation values of the plural sheets N of the plural different subject images M, and
   wherein the optical system satisfies the condition of $$X \geq M \times N \times 0.8.$$

2. The electronic still camera of claim 1, wherein the outputting means is a CRT printer by which the images I1 and I2 are formed on a photographic paper based on the first and second digital image signals.

3. The electronic still camera of claim 1, wherein the image reading means is a film scanner by which the visual image on the silver halide photographic material is read so as to generate the second digital image signals.

4. The electronic still camera of claim 1, wherein the optical system comprises an optical low pass filter provided between the image pickup lens and the image-focusing plane.

5. An electronic still camera comprising:
   an optical system including an image pickup lens, for focusing and image on a predetermined image-focusing plane;
   a solid-state image pickup element provided on the predetermined image-focusing plane and photoelectrically converting the focused image so as to generate image signals, the solid-state image pickup element having pixels in number A; and
   an A/D converter for converting the image signals into digital image signals;
   wherein (1) and image I1 is obtained in such a manner that a subject image is focused by the optical system on the solid-state image pickup element having pixels in number A so as to obtain first digital image signals and the image I1 is on a sheet by an outputting means based on the first digital signals, (2) an image I2 is obtained in such a manner that the same subject image is focused by the optical system on another solid-state image pickup element having pixels in number A+α so as to obtain second digital image signals and the image I2 is formed on a sheet by the outputting means based on the second digital image signals, (3) the image I1 and I2 are obtained on plural sheets N respectively for each of plural different subject images M, (4) the images I1 and I2 are evaluated in terms of contrast and sharpness, in the case that the image I1 shows higher contrast and higher sharpness than the image I2, and evaluation value is 1, and in the case that the image I2 shows higher contrast and higher sharpness than the image I2, an evaluation value is 0, the total evaluation value X is obtained by summing up the evaluation values of the plural sheets N of the plural different subject images M, and wherein α>50000 and the optical system satisfies the condition of $$X \geq M \times N \times 0.8.$$

6. The electronic still camera of claim 5, wherein the another solid-state image pickup element having pixels in number A+α has the same size of a light receiving surface as that of the solid-state image pickup element having pixels in number A.

7. The electronic still camera of claim 5, wherein α>100000.

8. The electronic still camera of claim 5, wherein α>500000.

9. The electronic still camera of claim 5, wherein the optical system comprises an optical low pass filter provided between the image pickup lens and the image-focusing plane.

* * * * *